(12) United States Patent
Barnett et al.

(10) Patent No.: US 10,057,354 B2
(45) Date of Patent: Aug. 21, 2018

(54) SYSTEM AND METHOD FOR SINGLE LOGOUT OF APPLICATIONS

(71) Applicant: Genesys Telecommunications Laboratories, Inc., Daly City, CA (US)

(72) Inventors: Jim H. Barnett, Auburndale, MA (US); Colin M. Leonard, Raleigh, NC (US); Zak Mandel, Vaughan (CA); Maxim Strigachov, Maple (CA); Michael J. Lyubinin, Concord, CA (US)

( * ) Notice: Subject to any disclaimer, the term of this patent is extended or adjusted under 35 U.S.C. 154(b) by 405 days.

(21) Appl. No.: 14/291,879

(22) Filed: May 30, 2014

(65) Prior Publication Data

US 2015/0350338 A1     Dec. 3, 2015

(51) Int. Cl.
*G06F 15/16* (2006.01)
*H04L 29/08* (2006.01)

(52) U.S. Cl.
CPC ............ *H04L 67/143* (2013.01); *H04L 67/22* (2013.01)

(58) Field of Classification Search
CPC .......... H03F 1/52; H04L 67/143; H04L 67/22
USPC .................................................. 709/203–248
See application file for complete search history.

(56) References Cited

U.S. PATENT DOCUMENTS

| | | | | |
|---|---|---|---|---|
| 5,283,888 A * | 2/1994 | Dao | ......................... | G06F 3/16 709/237 |
| 6,807,533 B1 * | 10/2004 | Land | ....................... | G06Q 40/12 705/30 |
| 7,493,402 B2 * | 2/2009 | McCarty | ................. | H04L 67/14 709/229 |
| 7,500,262 B1 * | 3/2009 | Sanin | ....................... | G06F 21/41 705/67 |
| 8,954,554 B2 * | 2/2015 | Bagwandeen | ...... | G06F 19/3406 370/338 |
| 9,083,691 B2 * | 7/2015 | Banford | ................ | H04L 67/145 |
| 9,137,668 B2 * | 9/2015 | Hassan | .................... | G06F 21/31 |
| 9,332,579 B2 * | 5/2016 | Scherer | ............... | H04W 76/021 |
| 9,462,068 B2 * | 10/2016 | Pieczul | ................... | H04L 67/22 |
| 9,485,239 B2 * | 11/2016 | Sanin | ....................... | G06F 21/41 |
| 9,529,349 B2 * | 12/2016 | Marti | ....................... | G05B 19/02 |
| 2002/0165954 A1 | 11/2002 | Eshghi et al. | | |
| 2003/0187991 A1 | 10/2003 | Lin et al. | | |
| 2006/0059556 A1 * | 3/2006 | Royer | ..................... | G06F 9/485 726/22 |
| 2006/0206926 A1 * | 9/2006 | Luo | ......................... | H04L 12/22 726/5 |
| 2006/0218628 A1 * | 9/2006 | Hinton | ................ | H04L 63/0815 726/8 |
| 2007/0213045 A1 | 9/2007 | Hermansson et al. | | |
| 2007/0255716 A1 | 11/2007 | Sabev et al. | | |
| 2008/0089303 A1 | 4/2008 | Wirtanen et al. | | |
| 2010/0013762 A1 * | 1/2010 | Zontrop | .................. | A63F 13/12 345/156 |

(Continued)

FOREIGN PATENT DOCUMENTS

WO          02091706 A1    11/2002

OTHER PUBLICATIONS

Article from USA Today dated May 28, 2014, "Microsoft CEO Nadella unveils Skype Translation".

(Continued)

*Primary Examiner* — Moustafa M Meky
*Assistant Examiner* — Thorne E Waugh

(57) ABSTRACT

A system includes an activity manager connected with a device, an application server and an identity provider. The activity manager clears a device session with both the identity provider and the application server to logout applications provided by the application server to the device.

20 Claims, 9 Drawing Sheets

(56) References Cited

U.S. PATENT DOCUMENTS

| | | | |
|---|---|---|---|
| 2010/0024015 A1* | 1/2010 | Hardt | H04L 67/14 726/6 |
| 2010/0071056 A1* | 3/2010 | Cheng | H04L 63/0815 726/16 |
| 2011/0066717 A1 | 3/2011 | Ahola | |
| 2012/0023236 A1 | 1/2012 | Backholm et al. | |
| 2012/0079586 A1 | 3/2012 | Brown et al. | |
| 2012/0150986 A1 | 6/2012 | Piccinini et al. | |
| 2012/0311165 A1 | 12/2012 | Renschler et al. | |
| 2013/0041790 A1 | 2/2013 | Murugesan et al. | |
| 2013/0198396 A1* | 8/2013 | Scherer | H04L 41/0806 709/227 |
| 2013/0235822 A1* | 9/2013 | Scherer | H04L 12/2887 370/329 |
| 2013/0246630 A1* | 9/2013 | Exton | H04L 67/02 709/227 |
| 2014/0095027 A1* | 4/2014 | Okuda | B60K 31/0008 701/41 |
| 2014/0136681 A1* | 5/2014 | Greenlee | H04L 67/14 709/224 |
| 2014/0189839 A1* | 7/2014 | Jezek | H04L 63/0815 726/8 |
| 2015/0169858 A1* | 6/2015 | Tg | G06F 21/32 726/18 |
| 2015/0347209 A1 | 12/2015 | Lyubinin et al. | |

OTHER PUBLICATIONS

International Search Report and Written Opinion for PCT/US2015/033360, dated Nov. 2, 2015, 16 pages.

* cited by examiner

SYSTEM AND METHOD FOR SINGLE LOGOUT OF APPLICATIONS

BACKGROUND

A client is computer hardware and software that accesses a service made available by a server. The server can be located on another computer system, in which case the client can access the service by way of a network. A server host runs one or more applications which share their resources with clients, and the clients can also execute applications on the client. A client can request a server's content or service functions.

BRIEF DESCRIPTION OF THE DRAWINGS

In association with the following detailed description, reference is made to the accompanying drawings, where like numerals in different figures can refer to the same element.

DETAILED DESCRIPTION

Systems and methods can control the logging out of users and/or the closing of applications executing on a device or across devices if no user-interface activity is detected in the applications for a specified interval of time. Additionally or alternatively, systems and methods can provide timing out applications during cross-device utilization. Additionally or alternatively, systems and method can provide single-logout functionality to multiple applications that were logged in using a single-login implementation. Additionally or alternatively, systems and methods can provide third parties, e.g., administrators, to log out users and/or close the applications.

Figure 1:
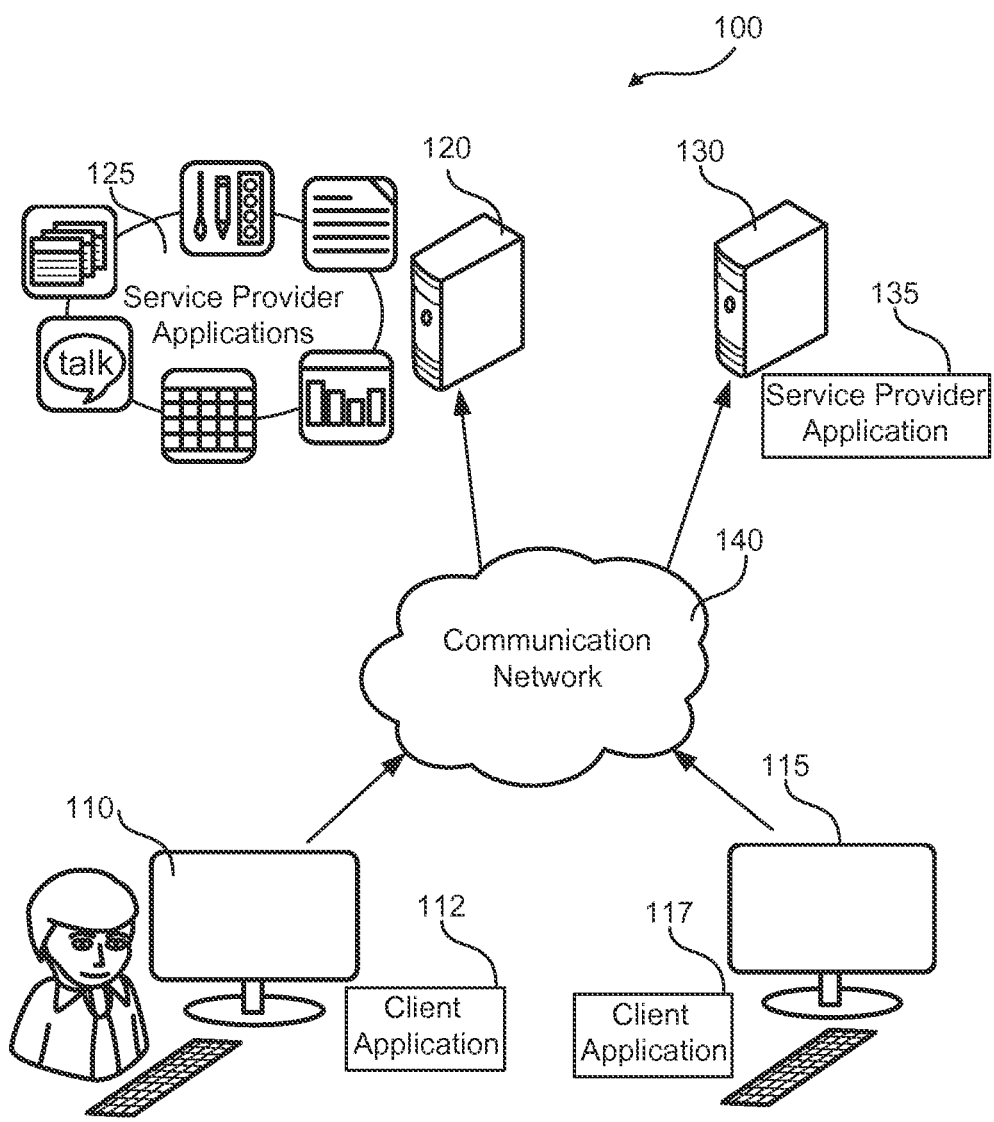
FIG. 1 is a block diagram of an exemplary client/server communication network.

FIG. 1 is a block diagram of an exemplary client/server communication network 100 for connecting client devices 110, 115 to application servers 120, 130. The client devices 110, 115, can include desktop personal computers (PC's), laptop computers, mobile communication devices, e.g., smart phones and personal digital assistants (PDA's), tablet computers, etc. Service providers can operate the application servers 120, 130 to provide the client devices 110, 115 with access to computer programs and/or other applications 125, 135 stored and/or executed on the application servers 120, 130. The applications 125, 135 can also be stored locally on the client devices 110, 115 and/or executed on the client devices 110, 115, e.g., via Java. The applications 125, 135 can include various types of computer programs, e.g., applications for contact centers, word processing programs, spreadsheets, calendars, email, messengers, media players, games, etc. The client devices 110, 115 include business computers and/or personal computers, including desktops, laptops, tablets, personal digital assistants (PDA's), smart phones, etc. The client devices 110, 115 connect with the application servers 120, 130 via a communication network 140. The communication network 140 can include the Internet and/or other communication networks, including local area networks, wide area networks, public switched networks, telecommunication networks, wireless networks, wired networks, satellite networks, etc.

In one implementation, the applications 125, 135 are used to process sensitive customer information, credit card numbers, social security numbers, etc., inputted into and/or received by the client devices 110, 115. The applications 125, 135 can be used in the home and for business, including agents at contact centers, employees at banks, attorneys at law offices, accountants at accounting firms, etc. As described in more detail below, the applications 125, 135 can be locked, closed, and/or logged out, etc. after a period of user-interface inactivity with the applications 125, 135, e.g., to prevent unauthorized access to the information displayed by the applications 125, 135. The lack of interaction with the application 125, 135 can include a lack activities other than user-interface interactions with the application. Additionally or alternatively, the applications 125, 135 can be locked then closed after a further time period of no user-interface interaction activity, and then the client device 110, 115 logged out after a further time period of no user-interface interaction activity, etc., or any combination of stepwise closing, locking and logging out.

For example, a contact center agent or bank employee may step away from the computer for a period of time. In one example, the applications 125, 135 can be closed or logged out or the computer locked to maintain a confidentiality of the information. Such closing, logging out or locking of the applications 125, 135 can comply with business or industry regulations, e.g., the payment card industry (PCI) security regulations, and can help ensure that customer payment card data is kept safe and protected against data breaches. Other reasons to close or lock the applications 125, 135 and/or logout a client 110, 115 after a period of no user-interface activity include resource management, e.g., limiting of number of users, application license management, maximizing performance of other active sessions by closing unused sessions, conserving battery power of mobile devices, etc. The time that an application 125, 135 is inactive can also be reported, e.g. to help with resource management. The closed, logged out or locked applications can include thin application provided by the servers 125, 135 and/or thick applications installed on the client devices 110, 115 and/or dynamically loaded on the client devices 110, 115, e.g., using JavaScript.

Figure 2:
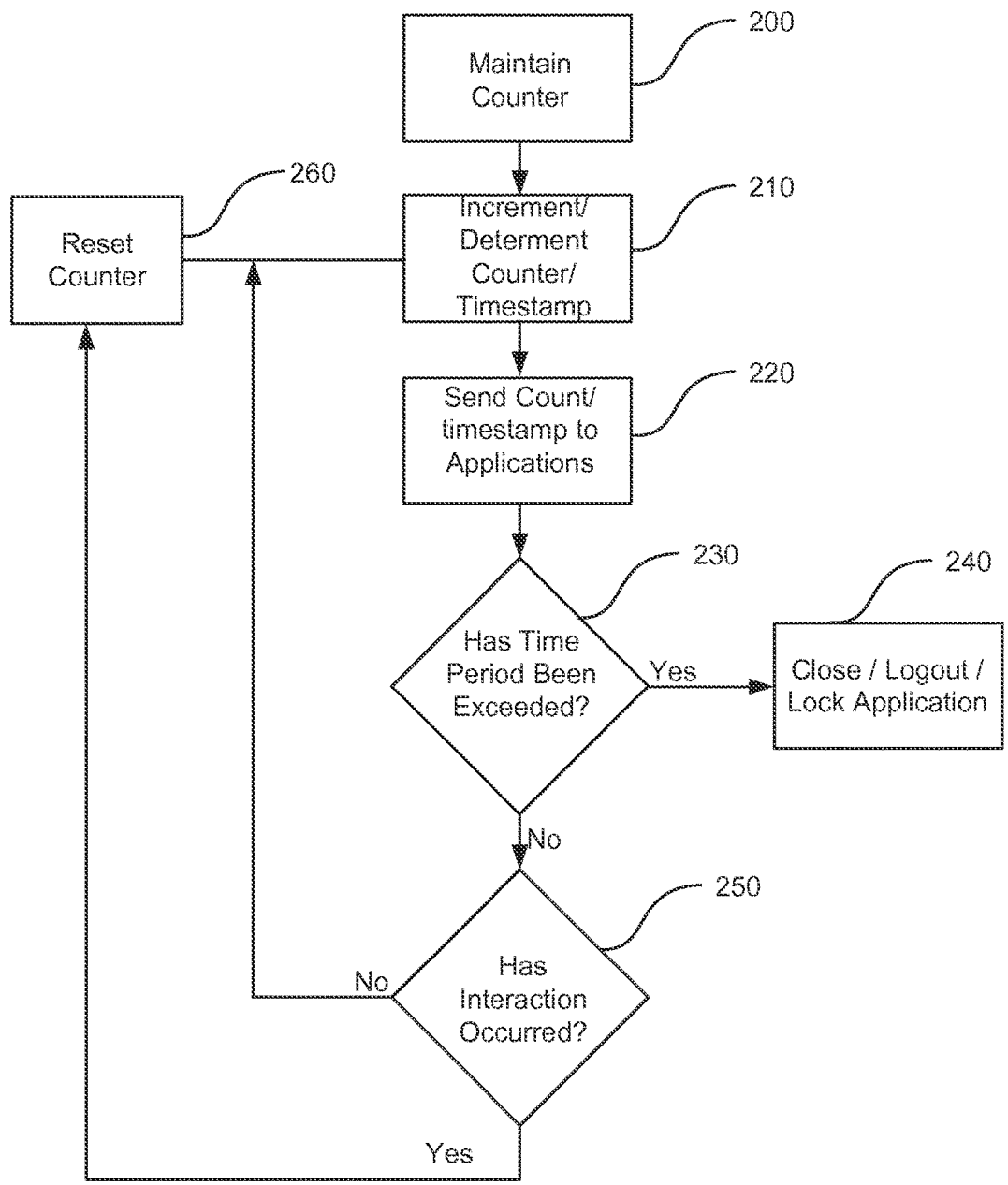
FIG. 2 is a flow chart of an exemplary logic for automatically closing, locking or logging out applications provided by the servers of service providers, upon a determined time period of no user-interface action with the applications.

FIG. 2 is a flow chart of an exemplary logic for automatically closing, logging out or locking out the client side use of the applications 125, 135 provided by the application servers 120, 130 upon determined time period of user-interface inaction with the applications 125, 135. For example, on the client-side, activity can be determined by one or more of detected mouse movements or clicks, voice commands, typing, swipes of the display, detected keyboard stroke, detected eye movement, etc. within a determined time period. For example, activity can be determined by a detected client device 110, 115 user-interface activity with the applications 125, 135. The type of activities monitored can be application 125, 135 and implementation dependent, e.g., tracking eye movement with a smart phone camera and tracking touches and swipes on a smart phone display. Another example includes a camera to monitor viewing of a wall board application. User identification can be determined to ensure that the session owner is watching the wall board application, and not only various persons who do not own the session of the wallboard application. The applications 125, 135 can be closed, the computer locked and/or the client device 110, 115 logged out based on no active use of the opened application 125, 135 during a determined time period. In one example, the client devices 110, 115 can utilize a web browser, JavaScript and a local memory or cache to access the applications 125, 135 from the application servers 120, 130 and close or lockout the applications 125, 135 and/or logout the client 110, 115.

In one implementation a browser application, e.g., Internet Explorer, Chrome, Firefox, etc., of the client device 110, 115 can maintain a counter value or timestamp (200). The timestamp can indicate a time of a user-interface activity per participating application and the counter value can represent a number of units of time since a user-interface activity of the application, e.g., counts of inactive intervals. Other applications can be used to keep track of time periods of activity of the applications 125, 135 executing on the client device 110, 115, e.g. an activity tracker 425 that monitors user-interface activities with applications 125, 135 accessed by the client device 110, 115 and can report periods of no user-interface activity to the activity monitor 420, described below. For example, a time period since a mouse click or a data entered into the application 125, 135, etc. can be monitored. Additional and/or alternative user interactions can be monitored, for example, a user-interface being used to move a window of the application 125, 135 on the display screen can be detected and considered an activity even though the application 125, 135 is otherwise inactive, e.g. showing a report which is unchanged because there is no new data traffic.

The counter value/timestamp can be incremented or decremented by the client device 110, 115, e.g., in JavaScript and/or based on an internal clock of the client device 110, 115 (210). Periodic messages that include the counter value/timestamp can be sent from the client devices 110, 115 to the applications 125, 135, application servers 120, 130 and/or activity monitor 420 described below, depending on an implementation, for processing to determine whether or not a period of interaction activity with the applications 125, 135 has been exceeded. The counter value/timestamp can be maintained separately for each application 125, 135. For example, the client device 110, 115 may execute multiple applications 125, 135 at the same time, and each executing application, including suites of applications, can receive its own counter value/timestamp message. The counter value/timestamp can be sent to all applications 125, 135 at the same time or sent at different times. The counter value for a particular application 125, 135 can be reset when the client device 110, 115 interacts with the application 125, 135, e.g., mouse movement or click, keypad strike, etc. Additionally or alternatively, if a timestamp is used instead of a counter, the timestamp need not be reset when the interaction occurs.

When there are no activities or interactions with the applications 125, 135, the applications 125, 135 can remain open for the determined time period. The time period of no user-interface activity or since the activity can be determined for the applications 125, 135. Multiple applications 125, 135 can remain open as long as one application 125, 135 is active, e.g., for a suite of applications or multiple application sessions by the same user being used on the same device or multiple devices located near each other, as described below. For example, a WORD document can remain open during an inactive period while the client device 110, 115 is working on the EXCEL application, and vice versa. Additionally or alternatively, applications 125, 135 can be independently closed after the determined time period has been exceeded for the application 125, 135. When the counter value/timestamp received by the application 125, 135 indicates that a time period of no user-interface activity for the WORD application has exceeded a determined amount, the WORD document is closed, the screen is locked, and/or or the client is logged out of the WORD document, etc., even though the EXCEL document remains open.

The counter value/timestamp messages used to determine the no user-interface activity time period can be sent using a messaging protocol or other message transport protocol implemented by hardware, software or firmware or a combination thereof of the client device 110, 115. The messages can be set using hypertext transfer protocol (http), user datagram protocol (UDP), transmission control protocol (TCP), Websphere MQ, simple mail transfer protocol (SMTP), remote procedure calls (rpc), JavaScript object notification (JSON) messaging, session initiation protocol for instant messaging (SIMPLE), or any other message transport mechanism. The message protocol signal can be sent from the client devices 110, 115 to the servers 125, 135 at regular intervals in the order of seconds or other determined intervals. The counter messages need not be sent at regular intervals and can be sent at irregular intervals. In accordance with the received counter value/timestamp, the server side applications 125, 135 determines if a time period of application user-interface inactivity has been exceeded (230). An exemplary time period is about fifteen minutes but other time periods can be used based on an implementation. The time period can be configurable, e.g., by an administrator of the client devices 110, 115 or application servers 120, 130, for any determined activity duration.

If the time period of user-interface inactivity has been exceeded the application 125, 135 can be closed, locked and/or the client device 110, 115 logged out (240), etc., or the application 125, 135 otherwise secured against an unauthorized viewing of the information. The client devices 110, 115 can receive coordinated status messages related to the applications 125, 135. For example, the activity manager 420 or other central server can cause the applications 125, 135 to show a session expiration warning, clean the warning if the user-interface reactivates, and conceal data when the timeout occurs.

The client devices 110, 115 and/or the application servers 120, 130 can monitor user interactions with the applications 125, 130, e.g., by monitoring user-interface interactions including mouse movements or clicks, keypad strokes, display screen touches and swipes, display viewings, etc. to determine if an interaction with the applications 125, 130 has occurred (250). If no interaction has occurred, the counter value continues to increase or decrease depending on the implementation (210). If an interaction has occurred, the client devices 110, 115 can reset the counter (260), e.g. to zero. This is one way that detected inactivity timeouts can be coordinated across applications 125, 135 on a client device 110, 115 or across client devices 110, 115. Other ways are described below. Therefore, closing or logout of applications 125, 135 and/or logout on a client device 110, 115 or across client devices 110, 115 can be coordinated as triggered by user-interface inactivity, user choice and/or other triggers, e.g., administrator choice.

Additionally or alternatively, the applications 125, 135 can monitor a time period between server side actions, e.g., inputted text, saves to memory, and other client initiated server actions, etc. to determine no user-interface activity. For example, the application servers 120, 130 can store an array or map of user activity of applications 125, 135 by device of the client devices 110, 115 during a session. A maximum allowed period of no user-interface activity for the applications 120, 130 executing on the device is compared to a timeout value, and the applications 120, 130 are closed or the user logged out or locked out when the no user-interface activity value exceeds the timeout value. The no user-interface activity value can vary depending on the application. For example, an application that can contain sensitive customer data can be configured to time out faster than applications that contain no customer sensitive data. When a device has been inactive for determined amount of time the application servers 120, 130 can log out the client device 110, 115.

If the client device 110, 115 is unable to send the message protocol signal or other message containing the counter value/timestamp to the application servers 120, 130, the severs 120, 130 can time out the session after a configured timeout period has passed without being able to send any message protocol signal. Additionally or alternatively, the applications 125, 135 can close or lock and/or the client 110, 115 be logged out if the applications 125, 135 do not receive the message protocol signal within a determined amount of time since the activity. In one implementation, the above described timeouts can be used for the mobile applications since chatty session management can consume battery.

Figure 3:
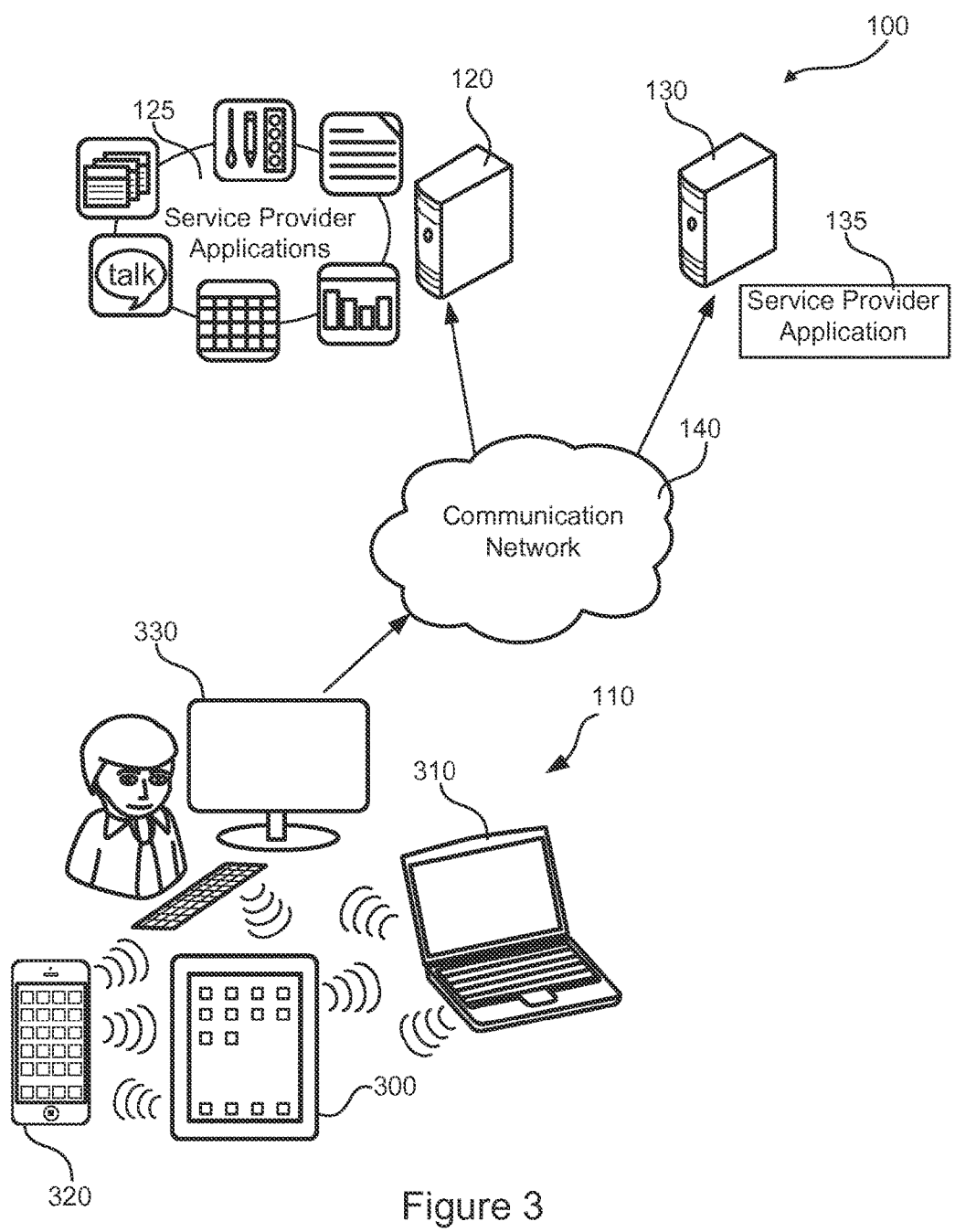
FIG. 3 is a block diagram of an exemplary communication network for timing out applications during cross-device utilization.

FIG. 3 is a block diagram of an exemplary communication network 100 for timing out applications during cross-device utilization. If client device 110 is executing applications 125, 135 on multiple devices, e.g., tablet 300, laptop 310, smart phone 320, and/or desktop computer 330 devices, the applications 125, 135 can be considered as separate sessions to be timed out independently or the applications 125, 135 together can be considered a single session to be timed out together. In one implementation, the applications 125, 135 can be timed out together if the devices are located near each other. For example, a single session can be established for applications 125, 135 that or executing on devices 300, 310, 320, 330 that are located near each other. Therefore, an interaction with applications 125, 135 running on one device can be considered an interaction with applications 125, 135 running on the other nearby devices to keep the applications 125, 135 open on the other nearby devices even if there has been no interaction activities on the nearby devices. The client devices 300, 310 320, 330 can have their own communication links to application servers 120, 130, utilizing wireline, wireless, etc. technologies. The client devices 300, 310, 320, 330 can include their own interaction activity reporting channel to the applications 125, 135, application servers 120, 130 or activity manager 420 described below. There can also be communication between client devices 300, 310, 320, 330, e.g., Bluetooth, near field communication (NFC), for proximity checking or other, e.g. data passing via bump, and the interaction activity can be reported via the communication network 140 to the applications 125, 135, application servers 120, 130 or activity manager 420. Various proximity components can be used to determine if devices are near each other, e.g., using Bluetooth low energy (BLE), radio frequency identification (RFID), bump actions, NFC, etc.

When proximity changes and devices 300, 310, 320, 330 are moved near to one other, their sessions can be merged into one session. For example, a knowledge worker can take a call on the smart phone 320, then walk to the desktop computer 330 and have an interaction workspace (IWS) with relevant customer information and call details pop up the display because the smart phone 320 is now proximal to the desktop computer 320. When the smart phone 320 and desktop computer 330 are located near each other, e.g., within short range wireless connectivity such as a dedicated short range communication, the application 125, 135 remains open as long as activity occurs on either the smart phone 320 or the desktop computer 330. Information about the single session can be stored with the applications 125, 135. Additionally, sessions can be transferred from one device 300, 310, 320, 330 to another device 300, 310, 320, 330. Moreover, a single session can be separated into multiple sessions when devices 300, 310, 320, 330 are moved away from each other.

In one example, an customer service agent is working with a contact center application, e.g., by GENESYS TELECOMMUNICATIONS LABORATORIES, INC. on the desktop computer 320, and a customer relationship management (CRM) application on another desktop computer 320 or the laptop computer 310, etc., for a single session. Additionally or alternatively, the contact center application and the CRM application can both be executing on the desktop computer 320 and the laptop computer 310, or any combination of devices and applications thereof. The applications can include separate timeout time periods for each application or a shared timeout time period for the shared contact center application and CRM application session. If the desktop computer 320 and the laptop computer 310 are located near each other, the applications on both the desktop computer 320 and the laptop computer 310 can be considered a single session and remain open while either the desktop computer 320 or laptop computer 310 applications are being interacted with within the determined timeout time period. Likewise, the applications can be closed, locked or logged out together upon no user-interface activity. When the laptop computer 310 moves away from the desktop computer 330, e.g., as determined by the short range communication protocol no longer able to communicate between devices 310, 330, the desktop session can be separated from the laptop session so that the applications executing on the desktop computer 330 and the laptop computer 310 are provided their own timeout time periods. Additionally or alternatively, other mechanisms for determining a nearness of the devices can be used, including a proximity sensor used to detect that the devices 310, 330 are no longer near each other.

Figure 4:
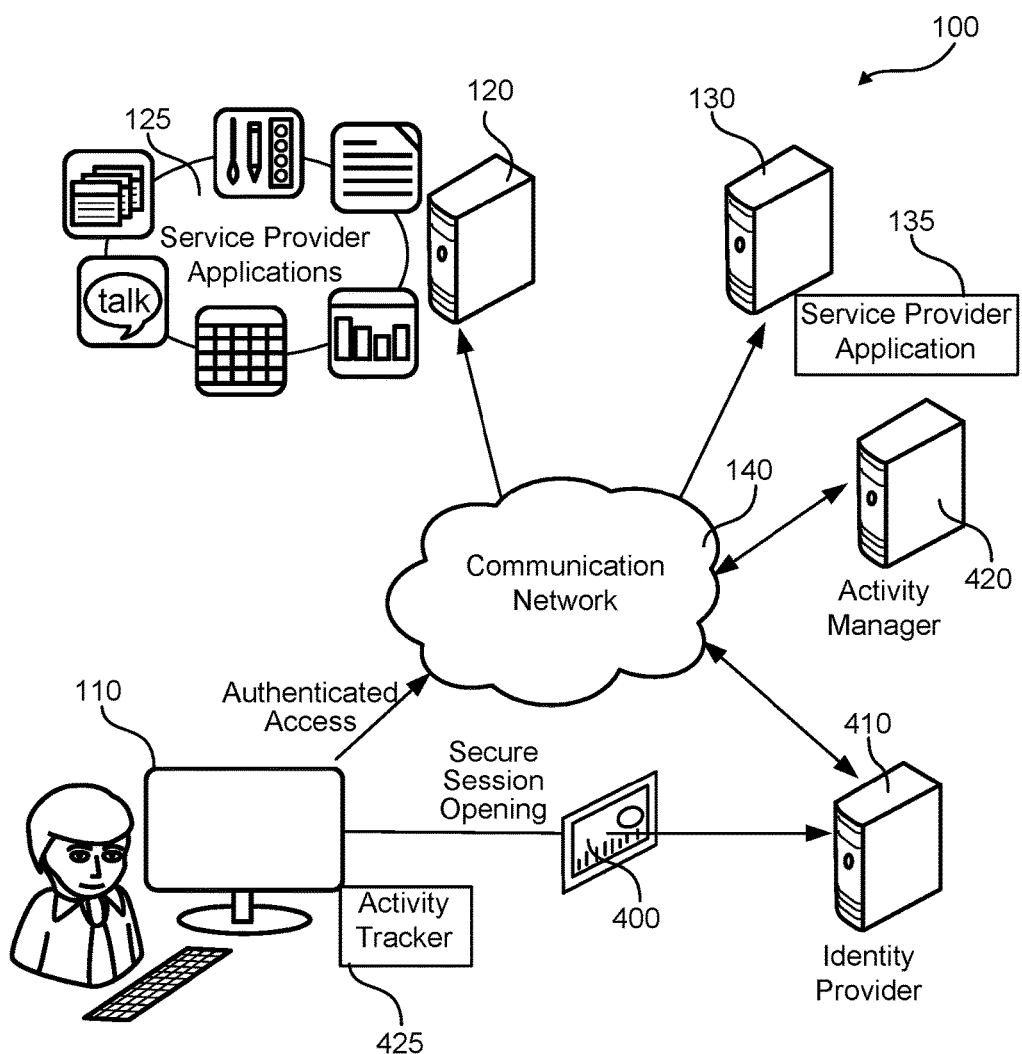
FIG. 4 is a block diagram of an exemplary communication network for single logout, lockout or closing of applications.

FIG. 4 is a block diagram of an exemplary communication network for single logout or closing of applications 125, 135 and/or logout of the client device 110. The client device 110 can log into multiple applications with a single login, e.g., provide login credentials once for multiple applications 125, 135 even though each application includes its own login, such that the applications 125, 135 behave as a single application for login. In one implementation, security assertion markup language (SAML) is a standard that offers single sign on (SSO), where the client device 110 sends user credentials 400 to an identity provider 410 and is then able to utilize multiple applications 125, 135, provided by the service providers and/or multiple service providers, without the client device 110 presenting credentials again. The identity provider 410 provides the credentials of the client device 110 to the service providers and/or to the applications. Other types of single-sign-in systems and/or applications can be used.

In one implementation, the client credentials are sent to the identity provider 410 using HTTP requests. The identity provider 410 determines whether there is an existing session for the client device 110. If there is no existing session, the identity provider 410 queries the client device 110 for a user name and password. If the user name and password are valid, or if the user is already logged in, the identity provider 410 redirects the client device 110 to the service provider along with an assertion that the client device 110 has been validated. Upon receipt of this assertion, the service provider determines it is dealing with an authenticated client device 110, and sets up a session with the client device 110. In a browser, sessions can be tracked by cookies, but other implementations are possible. Once the name and password are entered with the identity provider 410, a user is not aware of subsequent redirections to the identity provider 410. From the user's point of view he can use all the service provider applications 125, 135.

To log out of the applications 125, 135 without having to log out of each application 125, 135 separately, the communication network 100 includes an activity manager 420. The activity manager 420 can be implemented with software, firmware or hardware, or a combination thereof. The activity manager 420 can be implemented on a server that the client device 110, application server 120, 130 and/or identity provider 410 can access remotely, e.g., over the communication network 140. The activity manager 420 can process activity information across multiple applications 125, 135 on a client device 110 and/or across multiple client devices 110 for numerous applications 125, 135 accessed by the client devices 110 and/or executing on the client devices 110. The client devices 110 can have sessions with the identity provider 410 and one or more service provider applications 125, 135. The sessions can be independent of each other and for single log out are terminated in what appears to be a single operation to the user. Coordinated user-interface activity timeouts can also be applied to thick applications stored on and/or loaded on to the client device 110.

The communication system 100 can also include an activity tracker 425 implemented on a device of the client device 110 to track activities of applications stored or loaded on to the client device 110. Single-sign-in through different profiles supports thick client applications 112, 117 and the single logout mechanism can work with the activity tracker 425 notifying the thick application 112, 117 to end its session. The activity tracker 425 can be utilized as an intelligent agent of the central activity manager 420. The activity tracker 425 can monitor and determine application (in-)activity information on the client devices they are deployed on, e.g., not limited to applications within the monitored session. The activity tracker 425 can also report proximity information to other devices. If the threshold of no user-interface activity is reached or proximity status changes a message is sent to the activity manager 420, which can makes decisions based on information received from the activity trackers 425, e.g., including closing, logging out or locking out applications.

Figure 5:
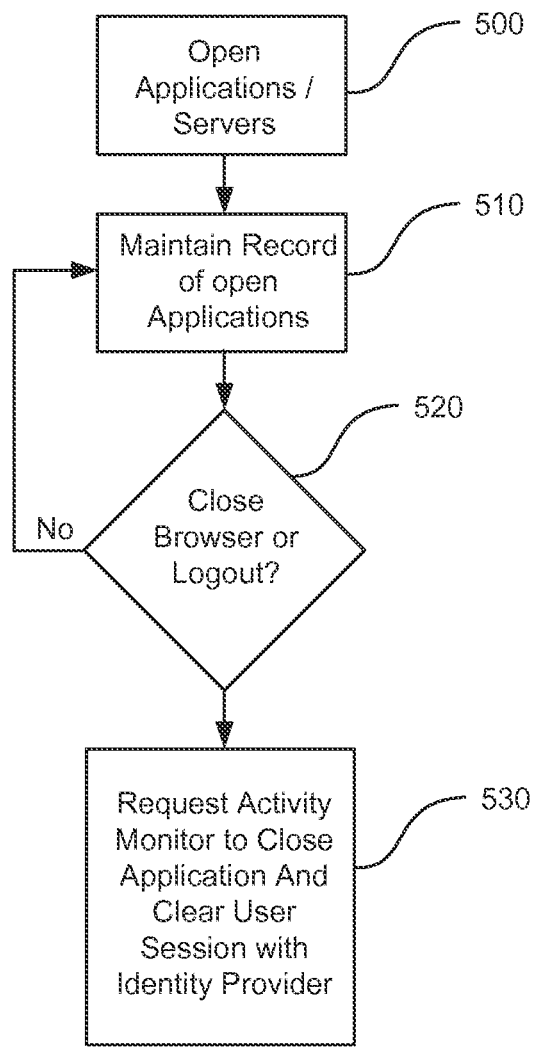
FIG. 5 is a flow chart of an exemplary logic for closing, locking out or logging out multiple applications.

FIG. 5 is a flow chart of an exemplary logic for closing, locking out or logging out the multiple applications 125, 135. Additionally or alternatively, a session can be split into two displays running in different browser instances. Session activity may be transferred to another browser or other display. In one example, a session is started from one browser instance, and another pops up dynamically with a prompt to determine whether or not the first window can be closed.

The client device 110 can open the applications 125, 135, e.g., using a single-sign-in procedure, e.g., SAML (500). When the client device 110 logs into the communication system 100, the client device 110 is also logged into the activity manager 420. Thereafter, for every application 125, 135 that the client device 110 logs into an application server 120, 130 of a service provider can send a communication message to the activity manager 420 when the client device 110 logs in and when the client device 110 closes the application, e.g. by closing a tab in the browser. The message can include the user name and an identifier for the session that has been created. The activity manager 420 maintains a record of the applications 125, 135 open on the client device 110 and/or maintains a record of application servers 120, 130 providing the applications 125, 135 (510). The registered applications 125, 135 and connected servers 120, 130 can be stored in a database for access by the activity manager 420, e.g., a Casandra database. The activity manager 420 tracks what sessions the client device 110 has open at any time. In one implementation, the activity manager 420 can track a subset of applications 125, 135 and not track others. For example, identified general purpose web browsing applications can be excluded from the tracked subset, as well as concurrently opened private social media sessions.

To logout the client 110 of the applications 125, 135, when the browser is closed or the logout button clicked, etc. (520), the client device 110 sends a request to the activity manager 420 to close the open applications. The activity manager sends commands to the identity provider 410 to clear the session and notifies the open service provider applications 125, 135 to terminate the sessions (530). In a web context, the application server 120, 130 can close or clear the session by removing the cookie set for the client device 110, and by clearing any internal records related to the session. Other methods for closing the session are possible. For example, sessions can be closed with a single-sign-in logout request since the activity manager 420 behaves as a service provider. Requests to the application servers 120, 130 can be achieved by the activity manager 420 acting as the client device 110, by using the stored session ID of the target application.

Therefore, the client device 110 can log out of all sessions with a single command. By clearing the sessions with the identity provider 410 and applications 125, 135, the client device 110 is not later automatically logged in by the identity provider 410 without knowledge of the client device 110. Additionally or alternatively, instead of the activity manager 420 sending a request to the identity provider 410 to clear the session, the application server 120, 130 sends the request to the identity provider 410 to clear the session before clearing its own session. In either case, the client device 110 session with the identity provider 110 can be cleared before the application server 120, 130 clears their own sessions. When the logout commands have been executed, the client device 110 no longer has a session with the identity provider 410 or any of the application servers 120, 130. The next time the client device 110 attempts to access any service provider resource, the client device 110 is requested to log in, e.g., by the identity provider 410.

Additionally or alternatively, a third party with appropriate privileges, e.g., an administrator, can send the logout command to the activity manager 420 and cause the client device 110 to be logged out with the applications 125, 135 and the user session cleared with the identity provider 410. Additionally or alternatively, the applications 125, 135 can send notifications of user-interface interaction activity or user-interface interaction inactivity to the activity manager 420, to identify which open applications are active. The activity manager 420 can track activity across all applications 125, 135, and close an application or logout the client device 110 is there is no activity in any of the applications 125, 135 for a determined interval of time, e.g., giving the counter value/timestamp of the recent activity in that interval. The time interval can be configurable based on an implementation, e.g., whether the client device 110 is displaying sensitive data or not and/or to manage application resources. If there is no application related activity within the interval, the service provider may either omit sending the activity message, or send one identifying that there has been no activity. In accordance with the activity messages, the activity manager 420 can determine the user-interface activities in any of the applications 125, 135 that the client device 110 has open. If a configurable interval passes without activity, the activity manager 420 can initiate log out on and/or close the sessions with the identity provider 410 and the service provider applications 125, 135. Additionally or alternatively, active applications can remain open. User-interface inactivity can also be determined by monitoring interactions with the applications 125, 135, as discussed above.

In a user-initiated log out case, an icon in one or more of the applications 125, 135 can provide an option to request the logout. When the logout is requested, e.g., by clicking on the icon, providing a voice command, etc. the application 125, 135 can send the request to log out to the activity manager 420. The activity manager 420 can check that the command was sent by a valid client device 110 and that the client device 110 is currently logged in. The activity manager 420 can execute the logout in the manner described above, and returns a notification to the applications 125, 135 once the logout operations are complete. The execution of the logout can include multiple commands to be sent and completed, but the logout appears as a single operation to the client device 110, and is triggered with a single operation, e.g. clicking on the icon. In the case that a system administrator requests the logout, client of the administrator sends a command to the activity manager 420 specifying the name of the client device 110 to be logged out and/or multiple client devices 110 to be logged out in one command. The activity manager 420 can check that the system administrator is authorized to execute the command, and then executes it, returning a notification to the administrator once the actions have completed. Therefore, the system administrator is also able to log out one or more users in a single operation.

Figure 6:
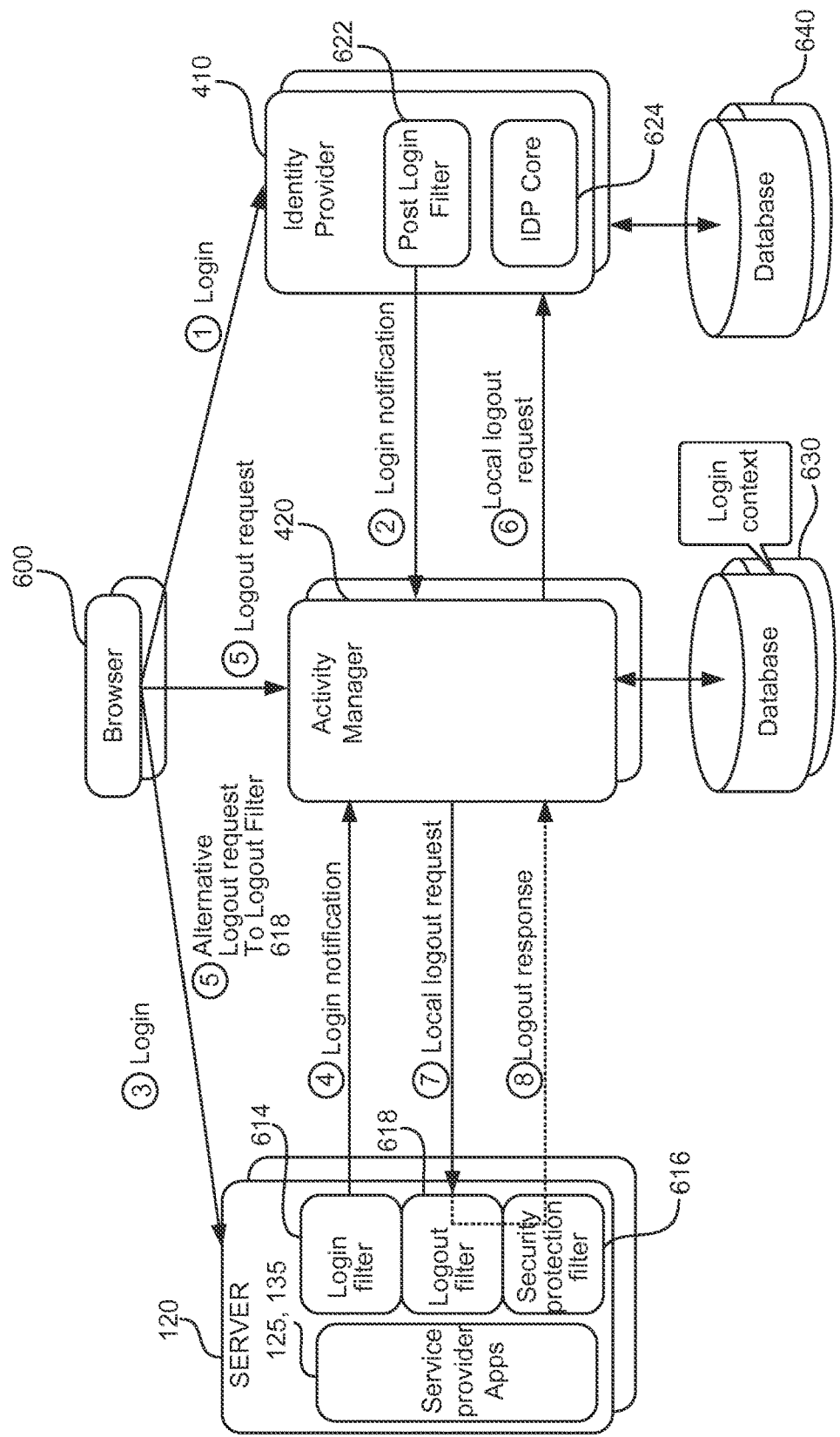
FIG. 6 is a block diagram of an exemplary multiple application, single login/logout, lockout or closing implementation including filters for server-to-server registration.

FIG. 6 is a block diagram of an exemplary multiple application, single login/logout, lockout or closing implementation including filters for server-to-server registration. A browser 600, e.g., of client device 110, logs in to a service provider, e.g., application server 120 of the service provider, to provide an application, e.g., service provider applications 125, 135. In a single log in implementation, the login information can be routed to the identity provider 410 (1). The identity provider 410 includes a post login filter 622 to send a login notification to the activity manager 420 (2). The identity provider 410 can also include an identity provider (IDP) core 624 and database 640 for processing single login/logout requests from client devices 110 and activity manager 420.

The activity manager 420 registers client logins/logout events and in some implementations can provide an interface for administrative logout requests. The login information is also sent to the application server 120 (3). The application server 120 can include a login filter 614, a security protection filter 616, e.g., SAML filter, and logout filter 618. The application server 120 can include a middleware software executing on a hardware server. Service provider applications 125, 135, or other web applications, can include software executing on the application server 120. When integrated with single-sign-in logic the service provider applications 125, 135 can have a role of single-sign-in service providers. Therefore, a logic of the security protection filter 616 can be included as part of the service provider applications 125, 135. Multiple service provider applications 125, 135 can be included on a single server 120 and/or on multiple servers. Each servicer provider application 125, 135 can behave as a service provider. The post login filter 622 registers client login requests on the activity manager 420, including information to terminate the session later. The server's 420 login filter 614 is responsible for registering requests from the client device 110 on the activity manager 420, including information to terminate the session (4). The logout filter is responsible to redirect the client device 110 to the activity manager 420, clear login/logout custom data on the application server 120, and set a success/failure parameter on the logout response.

The post login filter 622, login filter 614, security protection filter 616 and logout filter 618 can be implemented using HTTP filters which intercept single-sign-in message flows and register client device 110 sessions on the activity manager 420. When the client device 110 is authenticated by the identity provider 410, the post login filter 622 intercepts post-login-flow information and redirects the login notification to the activity manager 420, e.g., using an auto-submit HTML form with user session information. The activity manager 420 establishes a session with the client device 110, e.g., sends a cookie to the client device 110. The activity manager 420 can create and preserve user context and redirect the client device 110 to identity provider 410 to complete the single-sign-in authentication flow. When the client device 110 logs in to each application 125, 135, the login filter 614 intercepts single-sign-in flow and redirects the login notification to the activity manager 420, e.g., using an auto-submit HTML form with user session information. The activity manager 420 loads the user session, e.g., by sending the client device 110 a cookie, and updates a user login context with the service provider information.

When the client device 110 sends a logout request to log out service provider applications 125, 135, e.g., either via the activity manager 420 and/or directly to the server 120 (5), the activity manager 420 sends logout requests to the identity provider 410 and application server 120 (6 and 7). If the logout request is sent directly to the logout filter 618 (alternative 5), the logout filter 618 redirects the client device 110 to make the logout request to the activity manager 420 (6 and 7). The activity manager 420 can act as, e.g., pretend to be, the client device 110, using relevant session identifications of the client device 110, from the stored user login context. The login context can be stored in a database 630, e.g., a distributed database for storing and managing large amounts of data, e.g., Cassandra or other database. The activity manager 420 sends logout requests to the application server 120 and identity provider 410 to clear the application sessions and single login credentials, e.g., clear the respective cookies including the server session ID and identity provider session ID, with the application server 120 and identity provider 410 (6 and 7). The single logout procedure allows single sign in sessions to be closed, locked or logged out for multiple applications over multiple servers, without the need for the client device 110 to separately close, lock or log out each one. The single logout procedure can also ensure that the identity provider 410 does not maintain login credentials to erroneously log the client device 110 back into the applications, e.g., service provider applications 125, 135, without a client user's knowledge. The security protection filter 616 can send a logout response to the activity monitor 420 when the applications are logged out with the client device 110 (8). A correlation between identity provider 410 and application server 120 sessions is done by the provided username. Therefore, the logout process has an ability to terminate all user sessions at once. A specific user context is not terminated from the browser 600.

Figure 7:
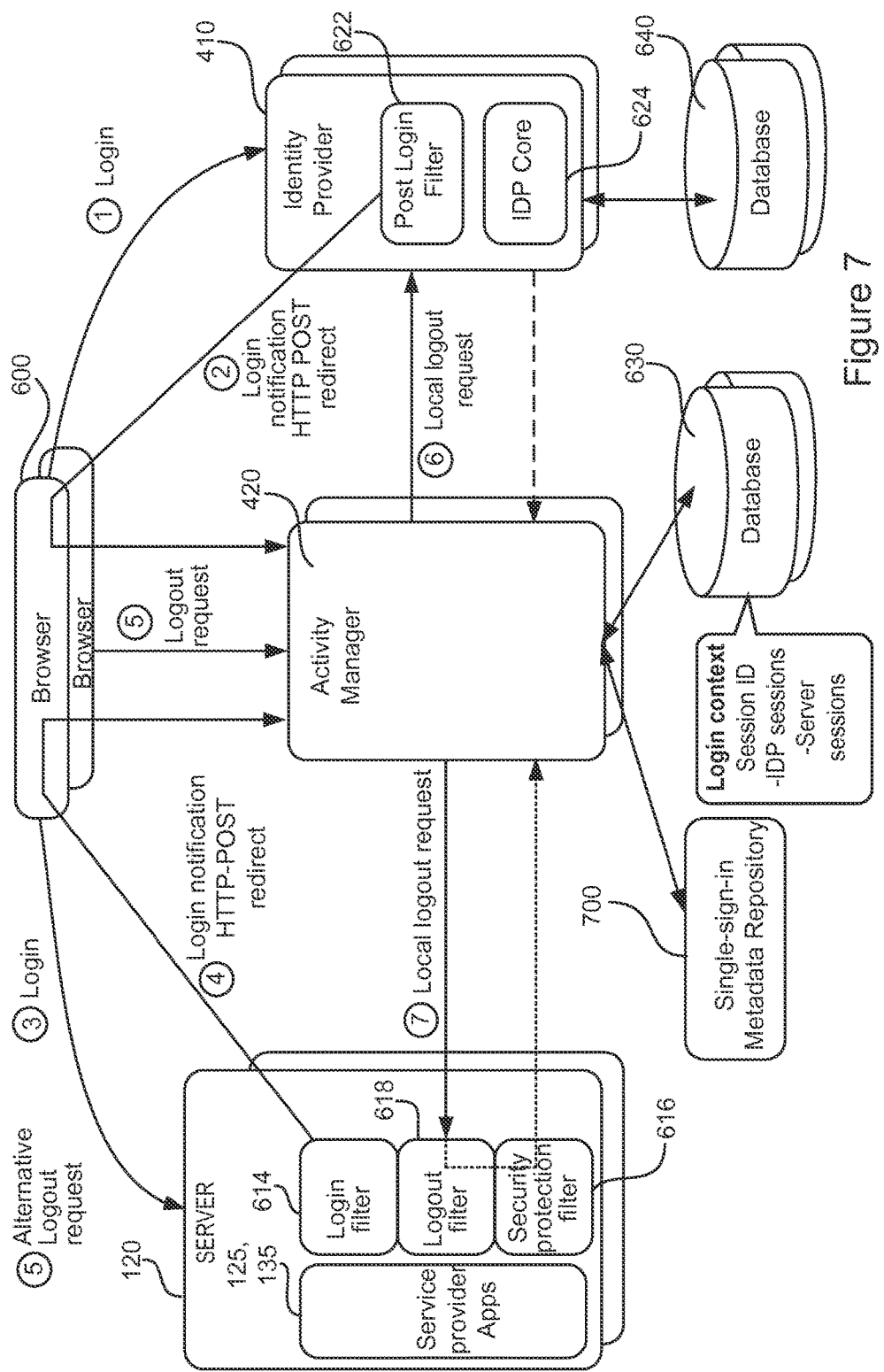
FIG. 7 is a block diagram of an exemplary multiple application, single login/logout, lockout or closing implementation including filters with post redirects.

FIG. 7 is a block diagram of an exemplary multiple application, single login/logout, lockout or closing implementation including filters with HTTP post redirects. The client device 110 authenticates login on the identity provider 410 via the browser 600 (1). On successful authentication, the identity provider 410 post login filter 622 is activated and triggers session registration on the activity manager 420. The post login filter 622 registers the client device 110 on the activity manager 420, fetches data from the user session, signs the data and expiration time and redirects the client device 110 to the activity manager 420, e.g., using an HTML auto-submit form (HTTP-POST redirection) (2). The activity manager 420 processes the registration, e.g., by validating data signatures and expiration, establishing user session, e.g., cookie, creates and stores user login context, including identity provider session information, and redirects the client to identity provider 410, e.g., using a return URL encoded in auto-submit form.

The identity provider 410 sends single-sign-in authentication responses to the application server 120 (3), e.g., of a service provider. The identity provider 410 completes single-sign-in authentication and sends the client device 110 login information to the application server 120 (4). The application server 120 logs in. The login filter 614 is activated on mapped requests and checks if registration is required or if credentials already exist for the client device 110. On subsequent redirected requests the login filter identifies that a principal session exists and triggers the session registration on the activity manager 420. The login filter 614 registers the client on the activity manager 420 (4). The login filter 614 fetches the registration data from the user session and redirects the user to the activity manager 420, e.g., using HTTP-POST redirection. The registration data is entered in the auto-submit form. The login filter can also mark the session as registered by a flag. The activity manager 420 processes the registration by validating the client device 110 session, e.g., that the client device 110 has a prior established session, e.g., a cookie that was set during registration request from the identity provider 410. The activity manager 420 also updates stored user login context with application server 120 session information and redirects the client device 110 to the application server 120, e.g., using a return URL encoded in auto-submit form.

When the client device 110 requests logout (5), e.g., via browser 600, the activity manager 420 can check client device 110 session validity. If the session is valid, the activity manager 420 retrieves relevant identity provider session information and list of involved servers 120, e.g., from database 630. To support administration requests, a dedicated application programming interface (API) of the activity manager 420 can be used. The activity manager 420 requests logout on the session on the identity provider 410 (6). The activity manager 420 can generate and send HTTP request to an identity provider local logout URL, e.g., custom URL exposed by a Shibboleth identity provider. The activity manager 420 can act as the client device 110 in this request, e.g., by using the session identification of the client device 110, so that the activity manager 420 is transparent to the application server 120. The application manager 420 can act as the client device 110 by using client's cookie, e.g., session ID's. The activity manager can access identity provider metadata from a single-sign-in metadata repository 700, e.g., SAML metadata repository, and access session data from the database 630 to generate the logout request. The activity manager 420 also requests logout on the application servers 120. The activity manager 420 generates and sends HTTP request to each application server 120, e.g., to their logout URL (7). The requests can be sent in parallel with clearing the identity provider 410 of the session. An exemplary application server 120 logout flow is described in FIG. 8. The security protection filter 616 can return a logout response to the activity manager 420 (8). After receiving responses and clearing the context, the activity manager 420 can return a combined response to the client device 110 of a successful, failed or partial successful closing of the application and request to close the browser 600.

Figure 8:
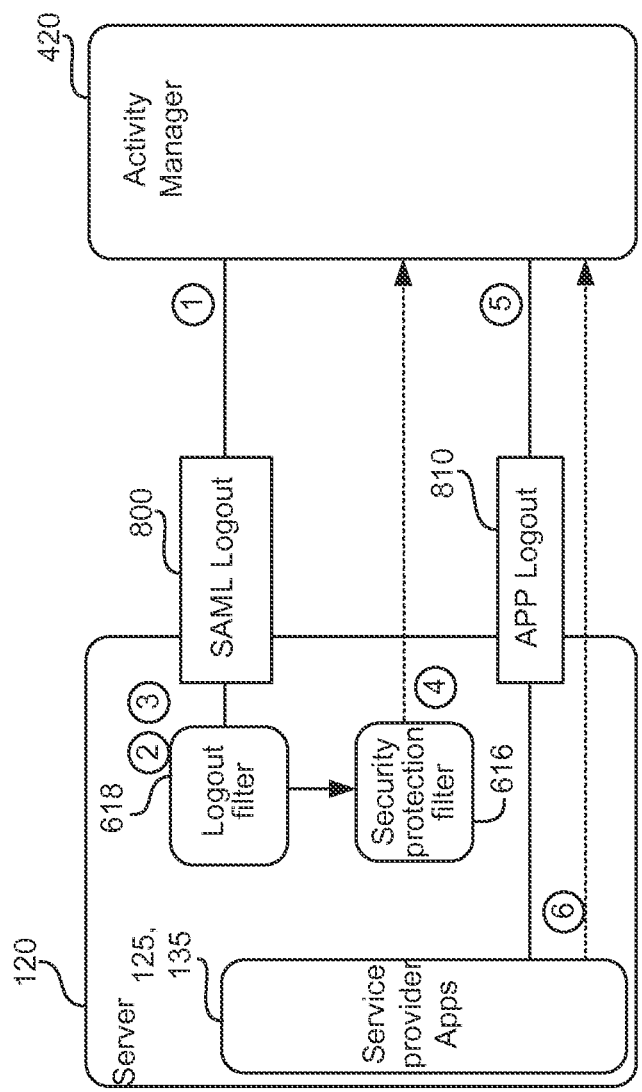
FIG. 8 is a block diagram of an exemplary server logout flow.

FIG. 8 is a block diagram of an exemplary application server 120 logout flow. The activity manager 420 sends a logout request (800) to a single-sign-in logout uniform resource locator (URL) for the application server 120 (1). The logout filter 618 of the application server 120 intercepts the request and determines that the request came from the activity manager 420, e.g., by validating the usernames and the identity provider cookies (2). The logout filter 618 clears the login session attributes used by the login filter to determine if registration is required or if the client device 110 already provided login credentials (3). The logout filter 618 passes control to the security protection filter 616 to clear the single-sign-in session and redirect to a configured application logout URL (810) (4). The activity manager 420 receives the redirect response and sends the logout request to the client logout URL (5). The service provider applications 125, 135 clear the session and returns an indication to the activity manager 420 that the session is closed (6).

Figure 9:
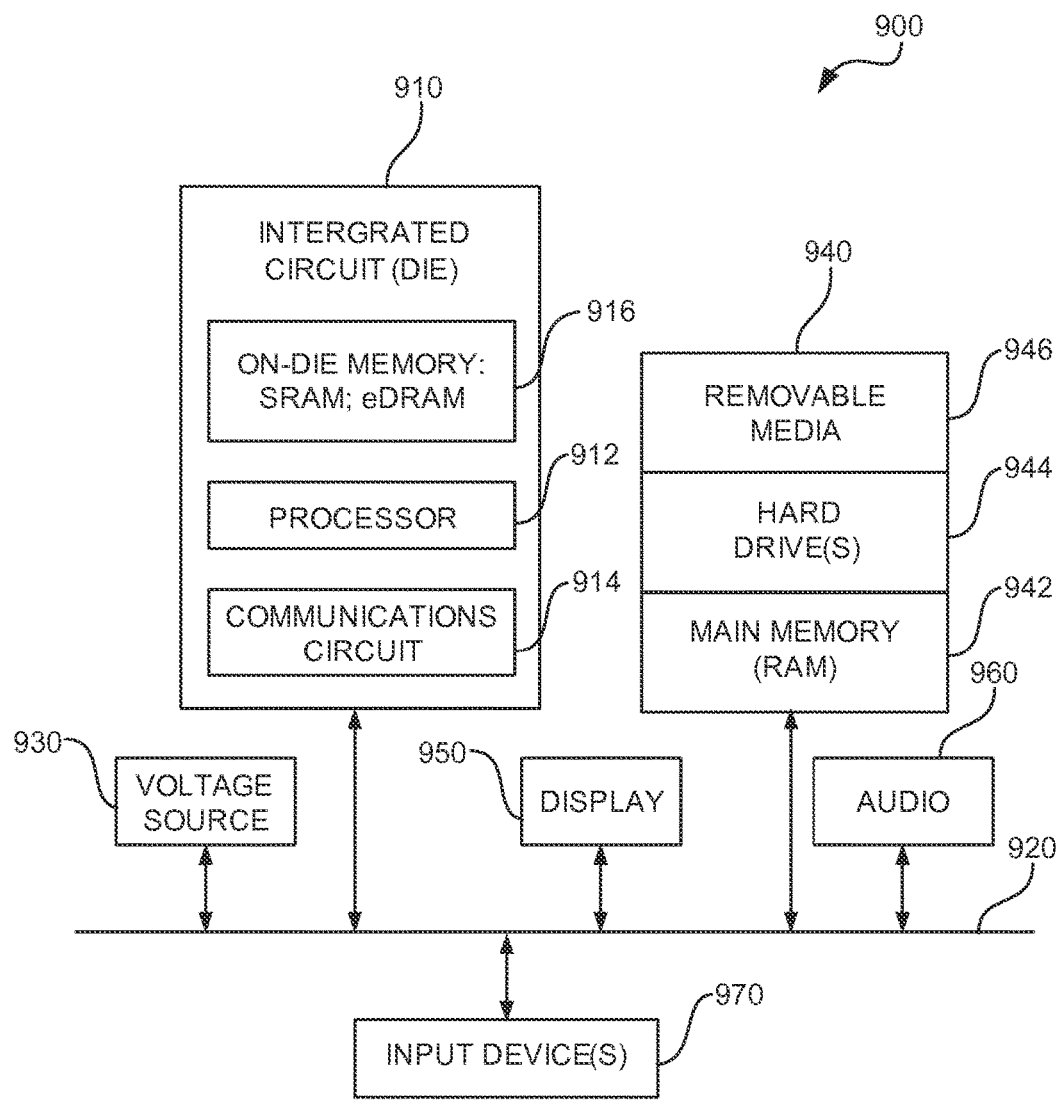
FIG. 9 is a schematic of an exemplary information and communication technology system.

FIG. 9 is a schematic of an exemplary information and communication technology system 900 for implementing the above systems and methods for logging out, closing and/or locking applications 125, 135. The systems and methods described above may be implemented in many different ways in many different combinations of hardware, software, firmware, or any combination thereof. In one example, the information and communication technology system 900 is a computer system that includes a system bus 920 to electrically couple the various components of the information and communication technology system 900. The system bus 920 is a single bus or any combination of busses according to various embodiments. The information and communication technology system 900 includes a voltage source 930 that provides power to the integrated circuit 910. In some implementations, the voltage source 930 supplies current to the integrated circuit 910 through the system bus 920.

The integrated circuit 910 can be electrically coupled with the system bus 920 and include any circuit, or combination of circuits according to an implementation. In on example, the integrated circuit 910 includes a processor 912 that can be of any type. The processor 912 may mean any type of circuit such as, but not limited to, a microprocessor, a microcontroller, a graphics processor, a digital signal processor, or another processor. Other types of circuits that can be included in the integrated circuit 910 are a custom circuit or an application specific integrated circuit (ASIC). The processor may also be implemented with discrete logic or components, or a combination of other types of analog or digital circuitry, combined on a single integrated circuit or distributed among multiple integrated circuits. The system and method may include a communications circuit 914 for use in wireless devices such as Bluetooth, near field communication (NFC), cellular, pagers, portable computers, two-way radios, and other information and communication technology systems. In an example, the processor 910 includes on-die memory 916 such as SRAM and/or eDRAM.

All or part of the logic described above may be implemented as instructions for execution by the processor 910, controller, or other processing device and may be stored in a tangible or non-transitory machine-readable or computer-readable medium such as flash memory, random access memory (RAM) 942 or read only memory (ROM), erasable programmable read only memory (EPROM) or other machine-readable medium such as a compact disc read only memory (CDROM), or magnetic or optical disk. A product, such as a computer program product, may include a storage medium and computer readable instructions stored on the medium, which when executed in an endpoint, computer system, or other device, cause the device to perform operations according to any of the description above.

In an example, the information and communication technology system 900 also includes an external memory 940 that in turn may include one or more memory elements suitable to the particular application, such as a main memory 942 in the form of RAM, one or more hard drives 944, and/or one or more drives that handle removable media 946, such as diskettes, compact disks (CDs), digital video disks (DVDs), flash memory keys, and other removable media.

In an example, the information and communication technology system 900 also includes a display device 950, an audio output 960. In an embodiment, the information and communication technology system 900 includes a controller 970, such as a keyboard, mouse, trackball, game controller, microphone, voice-recognition device, or any other device that inputs information into the information and communication technology system 900.

The processing capability of the system 900 may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

For example, a system includes a processor and a memory, where the memory stores instructions, which when executed by the processor, causes the processor to maintain a record of open applications and device session identifications, and clear the device session identifications with an application server and an identity provider for the open applications.

While various embodiments have been described, it can be apparent that many more embodiments and implementations are possible. Accordingly, the embodiments are not to be restricted.

The invention claimed is:

1. A system, comprising:
a processor; and
memory, wherein the memory has stored therein instructions that, when executed by the processor, cause the processor to:
receive information on a first session associated with a first application executed for a user, wherein the first application is executed on a first device;
receive information on a second session associated with a second application executed for the user, wherein the second application is executed on a second device separate from the first device;
maintain information on the first and second sessions;
detect that a location of the second device is within a threshold distance from the first device;
merge the first and second sessions into a single session in response to the detecting;
receive indication of a user-interface interaction with the first application;
attribute the user-interface interaction to the second application in response to the second device being located within the threshold distance from the first device;
in response to receiving the indication of the user-interface interaction, keep open the first application and the second application;
monitor time elapsed since receiving the indication of the user-interface interaction without detecting another user-interface interaction with the first application and the second application; and
in response to determining that a preset amount of the time has elapsed, transmit a message to close the single session, wherein the closing of the single session ends the first and second applications.

2. The system of claim 1, wherein the instructions that cause the processor to attribute the user-interface interaction to the second application include instructions that cause the processor to attribute despite lack of indication of independent user-interface activities with the second application.

3. The system of claim 1, wherein the memory includes instructions that further cause the processor to:
provide a command to an identity provider to clear a session associated with the user.

4. The system of claim 1, wherein the information include session identifiers of the first and second sessions, and a user ID associated with the user.

5. The system of claim 1, wherein the user-interface interaction is movement of a user input device.

6. The system of claim 1, wherein the user-interface interaction is input of a voice command.

7. The system of claim 1, wherein the user-interface interaction is eye movement.

8. The system of claim 1, wherein the instructions further cause the processor to:
detect that the second device is no longer located within the threshold distance from the first device; and in response to detecting that the second device is no longer located within the threshold distance, separate the single session to respectively the first session and the second session.

9. The system of claim 1, wherein the instructions further cause the processor to:
receive login credentials of a user from the first device for the first application; and
log-in the user to the first and second applications in response to receipt of the login credentials.

10. The system of claim 1, wherein the instructions that cause the processor to close the single session include instructions that cause the processor to logout the user from the first and second applications.

11. The system of claim 1, wherein the first and second applications are web applications.

12. A method comprising:
receiving, by a processor, information on a first session associated with a first application executed for a user, wherein the first application is executed on a first device;
receiving, by the processor, information on a second session associated with a second application executed for the user, wherein the second application is executed on a second device separate from the first device;
maintaining, by the processor, information on the first and second sessions;
detecting, by the processor, that a location of the second device is within a threshold distance from the first device;
merging, by the processor, the first and second sessions into a single session in response to the detecting;
receiving, by the processor, indication of a user-interface interaction with the first application;
attributing, by the processor, the user-interface interaction to the second application;
in response to receiving the indication of the user-interface interaction, keeping open the first application and the second application;
monitor time elapsed since receiving the indication of the user-interface interaction without detecting another user-interface interaction with the first application and the second application; and
in response to determining that a preset amount of the time has elapsed, transmitting, by the processor, a message to close the single session, wherein the closing of the single session ends the first and second applications.

13. The method of claim 12, wherein the user-interface interaction is attributed to the second application despite lack of indication of independent user-interface activities with the second application.

14. The method of claim 12 further comprising:
providing, by the processor, a command to an identity provider to clear a session associated with the user.

15. The method of claim 12, wherein the information include session identifiers of the first and second sessions, and a user ID associated with the user.

16. The method of claim 12, wherein the user-interface interaction is movement of a user input device.

17. The method of claim 12, wherein the user-interface interaction is input of a voice command.

18. The method of claim 12, wherein the user-interface interaction is eye movement.

19. The method of claim 12 further comprising:
detecting, by the processor, that the second device is no longer located within the threshold distance from the first device; and
in response to detecting that the second device is no longer located within the threshold distance, separating, by the processor, the single session to respectively the first session and the second session.

20. The method of claim 12 further comprising:
receiving login credentials of a user from the first device for the first application; and
logging in the user to the first and second applications in response to receipt of the login credentials.

* * * * *